United States Patent [19]

Jäger et al.

[11] Patent Number: 4,509,087
[45] Date of Patent: Apr. 2, 1985

[54] TAPE GROUNDING ELEMENT IN A MAGNETIC-TAPE CASSETTE

[75] Inventors: Lothar Jäger; Anton Peter; Reinhard Winkler, all of Vienna, Austria

[73] Assignee: U.S. Philips Corporation, New York, N.Y.

[21] Appl. No.: 423,000

[22] Filed: Sep. 24, 1982

[30] Foreign Application Priority Data

Jan. 7, 1982 [AT] Austria ................................. 33/82

[51] Int. Cl.$^3$ ............................................. G11B 15/60
[52] U.S. Cl. ................................ 360/130.21; 360/132
[58] Field of Search ........................... 360/132, 130.21; 242/197–200

[56] References Cited

U.S. PATENT DOCUMENTS

| 3,601,654 | 8/1971 | Long et al. | 361/212 |
| 3,666,203 | 5/1972 | Sato et al. | 360/132 X |
| 3,796,394 | 3/1974 | Souza | 360/132 X |
| 4,285,020 | 8/1981 | Sato | 360/132 |
| 4,345,284 | 8/1982 | Saito | 360/132 |

Primary Examiner—John H. Wolff
Attorney, Agent, or Firm—David R. Treacy

[57] ABSTRACT

A magnetic-tape cassette having an electrically conductive cylindrical tape guide which contacts the base side of the magnetic-tape, and has an axial recess accessible from the exterior for grounding the tape. An electrically conductive resilient element is arranged in the cassette, with one portion of the element positioned against the coating side of the magnetic-tape at the location of the guide, and the other side of the element in conductive electrical contact with the tape guide.

10 Claims, 15 Drawing Figures

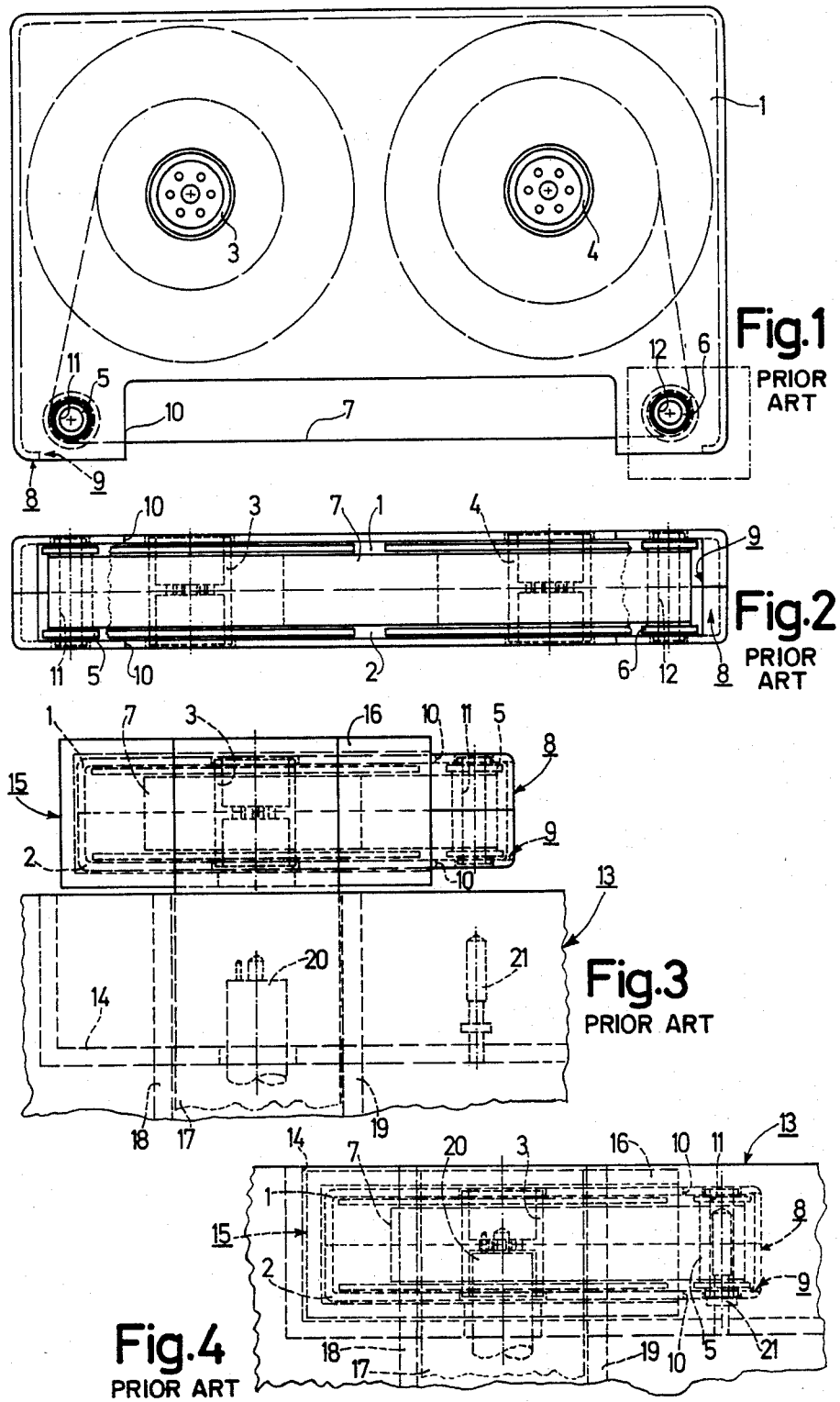

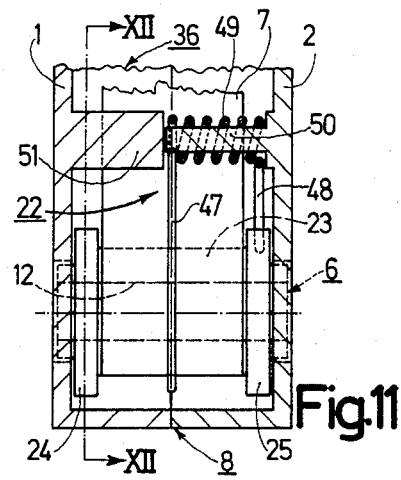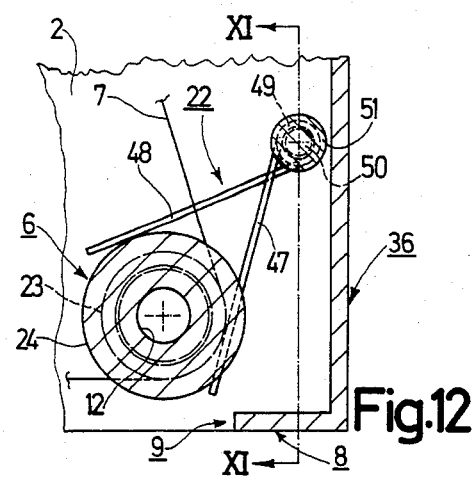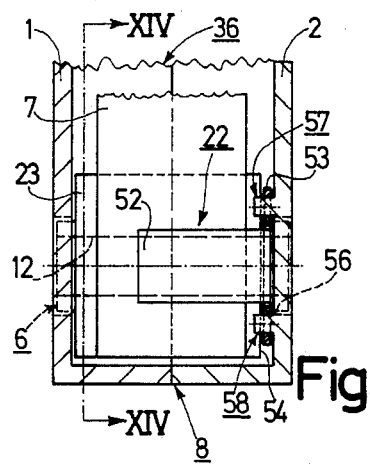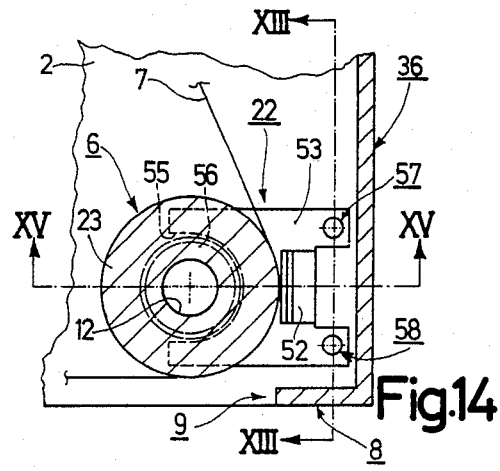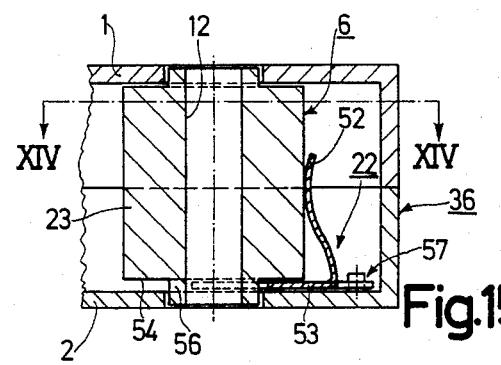

TAPE GROUNDING ELEMENT IN A MAGNETIC-TAPE CASSETTE

BACKGROUND OF THE INVENTION

The invention relates to a magnetic-tape cassette for a magnetic-tape apparatus, which cassette comprises at least one electrically conductive cylindrical tape guide which is arranged to be movable to a limited extent and which is formed with at least one axial recess which is accessible from the exterior of the magnetic-tape cassette. The magnetic tape passes with its base side along a part of the circumferential surface of the tape guide with its base side contacting that surface. An electrically conductive locating pin is arranged on the apparatus and is at the reference potential of the apparatus. The locating pin engages the recess in the tape guide upon insertion of the magnetic-tape cassette into the magnetic-tape apparatus. Such a magnetic-tape cassette is for example described in U.S. Pat. No. 4,234,140 (herewith incorporated by reference), which also describes how the magnetic-tape cassette can be inserted into the magnetic-tape apparatus: that is, how it can be brought into its operating position, so that the locating pin on the apparatus engages the recesss in the tape guide and accurately defines the position of the cassette, which as is known is essential for a correct tape transport.

A problem with such magnetic-tape cassettes is that the coating side of the magnetic tape may be charged electrostatically, which gives rise to problems during operation. In order to drain such electrostatic charges it has been proposed in German Offenlegungsschrift No. 30 10 772 to provide a grounding element inside the cassette. The element is in contact with the coating side of the magnetic tape and, when the magnetic-tape cassette is inserted into the magnetic-tape apparatus from outside the magnetic-tape cassette, comes into electrically conductive contact with an electrically conductive part of the apparatus which is at reference potential. For this purpose U.S. Pat. No. 4,285,020 (herewith incorporated by reference) describes some constructions, one of these constructions being to arrange an electrically conductive strip-shaped resilient element in the magnetic tape cassette. One end of the element pressed against the coating side of the magnetic tape which extends between two tape guides, and the other end projects through an opening in the side wall of the magnetic tape cassette. Upon insertion of the magnetic-tape cassette into the magnetic-tape apparatus, this other end can come into electrically conductive contact with a leaf spring on the apparatus. Another construction comprises a pivotable lever arranged in the magnetic-tape cassette, a pin-shaped end of this lever being in contact with the coating side of the magnetic tape which extends between two tape guides and the other end, upon insertion of the magnetic-tape cassette into the magnetic-tape apparatus, coming into electrically conductive contact with a locating pin which then penetrates into the magnetic-tape cassette. This locating pin positions the entire magnetic-tape cassette.

It is evident that the steps for draining an electrostatic charge from the coating side of the magnetic tape proposed in DE-OS No. 30 10 772 are comparatively intricate and expensive. This is particularly disadvantageous because such magnetic tape cassettes are mass products, and should be as cheap as possible.

SUMMARY OF THE INVENTION

It is the object of the present invention to ensure that an electrostatic charge on the coating side of the magnetic tape in a magnetic-tape cassette of the type mentioned in the opening paragraph is drained in a particularly simple manner.

According to the invention an electrically conductive resilient element, which is associated with the tape guide, is arranged inside the magnetic-tape cassette adjacent the coating side of the magnetic tape and comprises at least two portions, of which one portion contacts the coating side of the magnetic tape at the location of the tape guide and the other portion is in electrically conductive contact with the tape guide. In this way the tape guide, which is already present in the magnetic tape cassette and which cooperates with the locating pin on the apparatus upon insertion of the magnetic-tape cassette into the magnetic-tape apparatus, is used for establishing electrically conductive contact, via the resilient element, between the apparatus and the coating side of the magnetic tape. Except for the resilient element, which may be of a very simple construction, only parts which are already present are utilized for implementing the present invention, so that the entire construction is very simple. Since one portion of the resilient element is in contact with the coating side of the magnetic tape at the location of the tape guide, a reliable contact with this coating side and thus a correct draining of electric static charges from this side is guaranteed.

It is found to be very advantageous if the resilient element is a leaf spring, which comprises at least two spaced substantially parallel limbs which project from a main body and which form the two portions of the resilient element. One limb is disposed tangentially against the coating side of the magnetic tape, the other limb is disposed tangentially against the tape guide itself beside the magentic tape, and the main body locates the resilient element inside the magnetic-tape cassette. Such a resilient element is of a very simple construction and guarantees a satisfactory electrical contact with the coating side of the magnetic tape and with the tape guide. In order to arrange the resilient element inside the magnetic-tape cassette, the main body of the resilient element may, for example, be riveted to the inner side of the housing of the magnetic-tape cassette or it may be inserted into suitable slots which define its position.

In a magnetic-tape cassette in which the cassette wall adjacent the tape guide has an opening which extends transversely of the tape guide it is found to be advantageous if the main body is strip-shaped up to the free ends of the two limbs, and the limbs are spaced from the body by punched-out portions. The free ends project from the major strip surface in the same direction towards the tape guide. The main body comprises at least one U-shaped angular portion at its end adjacent the free ends of the limbs, and can be inserted into the opening of the cassette wall from outside the magnetic-tape cassette, the U-shaped angular portion of the main body engaging a corresponding profile of the cassette wall. This results in particularly simple assembly of the resilient element inside the magnetic-tape cassette, because it suffices to insert the element from outside into the finished magnetic-tape cassette, so that subsequent mounting in an existing magnetic-tape cassette is possible.

In this respect it is also found to be advantageous if the main body comprises a further limb which is spaced from the body by punched-out portions and which projects from its major strip surface, the free end of this further limb being located behind a stop on the magnetic-tape cassette upon insertion of the resilient element into the opening in the cassette wall. Thus, a resilient element mounted in a magnetic-tape cassette is latched in position, so that it cannot become detached inadvertently.

It is also found to be advantageous if the main body is resiliently braced inside the magnetic-tape cassette with the end which is romote from the U-shaped angular portion. Bracing the resilient element in this way ensures that the element remains in the correct position and that a particularly satisfactory contact of the limbs of the resilient element with the coating side of the magnetic tape and the tape guide is obtained.

A very simple construction for a resilient element is also obtained if the resilient element is a spring having two limbs which are biassed towards each other, which limbs constitute the two portions of the resilient element, the guide pin being between the two limbs. One limb is disposed tangentially against the coating side of the magnetic tape, and the other limb is disposed tangentially against the tape guide itself and spaced axially from the magnetic tape. The central portion of the spring which interconnects the two limbs is braced inside the magnetic-tape cassette.

For a simple construction of the resilient element it is also found to be advantageous if the resilient element is an L-shaped element whose two limbs form the two portions of the resilient element, one limb which extends in the axial direction of the tape guide being disposed against the coating side of the magnetic tape and the other limb being disposed against an axial end surface of the tape guide itself.

It is also found to be advantageous if the portion of the resilient element which is in contact with the coating side of the magnetic tape is positioned against this coating side at the location of the longitudinal plane of symmetry of said tape. This ensures that the resilient element acts symmetrically on the magnetic tape, so that the tape transport is not influenced in an undesired manner.

However, a simple construction for a resilient element is also obtained if the two portions of the resilient element are together formed by a strip-shaped resilient tongue, which is in contact with the coating side of the magnetic tape and which is in contact with the tape guide itself beside the edge portion. Such a resilient element may also be symmetrical, one of two strip-shaped resilient tongues being in contact with the coating side of the magnetic tape at one of the two edge portions of said tape and being in contact with the tape guide itself beside this edge portion.

The invention will be described in more detail, by way of example, with reference to the drawings which show some prior-art constructions and some embodiments of the invention.

BRIEF DESCRIPTION OF THE DRAWING

FIG. 1 is a schematic plan view of a known magnetic-tape cassette showing one of its two major surfaces.

FIG. 2 is a front elevation of the magnetic-tape cassette shown in FIG. 1, showing the long side of the cassette which is formed with an opening.

FIG. 3 is a schematic side elevation of a known device in a magnetic-tape casette apparatus for inserting a magnetic-tape cassette into the apparatus, the cassette holder being provided for this purpose in a lifted position relative to the apparatus and containing a magnetic-tape cassette.

FIG. 4 is a side elevation of the device shown in FIG. 3 with the cassette holder in the lowered position, the magnetic-tape cassette contained in the holder being in its operating position.

FIG. 11, in the same way as FIG. 5, shows a further embodiment in which a resilient element formed by a spring comprises two limbs which are biassed towards each other.

FIG. 12 is a sectional plan view taken on the line XII—XII in FIG. 11.

FIG. 13, in the same way as FIG. 5, shows another embodiment which comprises an L-shaped resilient element.

FIG. 14 is a sectional plan view taken on the line XIV—XIV in FIG. 13.

FIG. 15 is a further sectional side view taken on the line XV—XV in FIG. 14.

DESCRIPTION OF THE PREFERRED EMBODIMENTS

Figure 5:
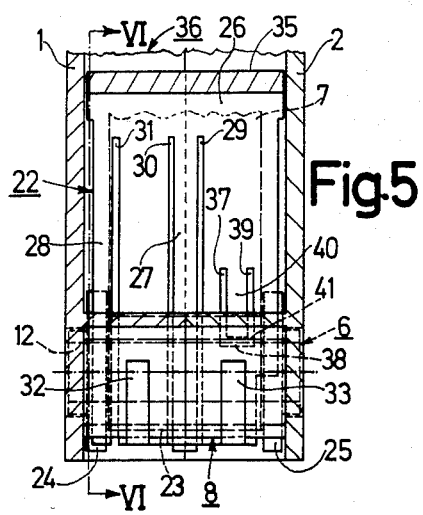
FIG. 5 is a sectional side view of a part of a magnetic-tape cassette in accordance with a first embodiment of the invention, in which a main body from which three limbs project.

FIGS. 1 and 2 show a magnetic-tape cassette comprising two housing sections 1 and 2, accommodating two winding hubs 3 and 4 and two tape guides 5 and 6 formed by rollers. A magnetic tape 7 extends from the winding hub 3 via the tape guide 5 along an opening 9 in a cassette wall 8 constituting a narrow side of the magnetic-tape cassette formed by the two housing sections to the tape guide 6 and hence to the winding hub 4. The magnetic tape faces the opening 9 with its coating side, which means that its base side is in contact with the tape guides 5 and 6. In each of the two major surfaces of the housing sections 2 and 3 an opening 10 is formed, which is a continuation of the opening 9, which openings give access to the magnetic tape at its base side. Thus, at the location of the openings 9 and 10 the magnetic tape 7 can be withdrawn from the magnetic tape cassette in order to bring its coating side into contact with the magnetic heads, which magnetic heads may form part of a rotary magnetic-head system as used in magnetic-tape equipment for recording and/or reproducing television signals. In principle, it is also possible to pass the magnetic heads through the opening 9 for their co-operation with the coating side of the magnetic tape. The magnetic tape is driven in the customary manner by means of a capstan and a pressure roller, which co-operate with the magnetic tape inside or outside the magnetic-tape cassette.

For an exact recording or reproducing process by means of such a magnetic-tape cassette it is essential that the path of the magnetic tape is accurately defined. Therefore, the tape guides 5 and 6 are arranged to be movable to a limited extent inside the magnetic-tape cassette and are formed with at least one axial recess 11 and 12 respectively, which is accessible from the exterior of the magnetic-tape cassette, a locating pin on the apparatus engaging said recess upon insertion of the magnetic-tape cassette into the magnetic-tape apparatus and thereby accurately defining the position of the cassette. The recesses 11 and 12 respectively may be formed as blind bores in both ends or as through-bores in order to permit reversal of the magnetic-tape cassette. Since the tape guides, as already stated, are essential for the lace-up, they are generally made of a metallic material for a suitable dimensional stability, which material is also electrically conductive. The same applies to the locating pins on the apparatus, which are generally also made of an electrically conductive metallic material and which are arranged on the chassis of the apparatus. As a result of this, the locating pins are at the reference potential of the apparatus, which then also applies to the tape guides when they engage the locating pins, because this establishes an electrically conductive contact between said guides and the locating pins.

A magnetic-tape cassette is, for example, inserted into a magnetic-tape apparatus as illustrated by means of FIGS. 3 and 4. In these Figures 13 designates a part of a magnetic-tape apparatus having a box-shaped recess 14. Into or out of which a cassette holder 15 can move, which may be effected manually or by means of a motor. The cassette holder has a cassette compartment 16, into which a cassette can be inserted, with its closed long and narrow side in front, when the cassette holder is in its position in which out of the recess 14, as is shown in FIG. 3. The cassette compartment 16 has a lateral guide ridges 17 on each side, which extend between guide rails 18 and 19 on the apparatus, thereby defining the movement of the cassette holder. Drivable winding mandrels 20 and stationary locating pins 21 project from the recess 14 in the apparatus, only one of each of said elements being visible in FIGS. 3 and 4. If now the cassette holder, whose cassette compartment contains a magnetic-tape cassette is lowered into the recess 14 from the position shown in FIG. 3, the magnetic-tape cassette reaches its operating position, in which in the customary manner the winding mandrels 20 co-operate with the winding hubs 3 and 4 respectively and the locating pins 21 engage the recesses 11 and 12 respectively in the tape guides 5 and 6, so that they are positioned exactly. This establishes an electrically conductive contact between the locating pins and the tape guides in the operating position of the magnetic-tape cassette.

In accordance with the invention, this electrically conductive contact between a locating pin and the tape guide which engages said pin when the magnetic-tape cassette is in the operating position is utilized for draining electrostatic charges from the coating side of the magnetic tape in a simple manner. For this purpose there is provided an electrically conductive resilient element associated with at least one of the two tape guides 5 and 6 respectively, which element is arranged inside the magnetic-tape cassette substantially opposite the coating side of the magnetic tape and comprises at least two portions, of which one portion contacts the coating side of the magnetic tape at the location of the tape guide and of which the other portion is in electrically conductive contact with the tape guide. Hereinafter, various embodiments are described for use in conjunction with the tape guide 6. However, similar steps may also be taken for the tape guide 5 or for both tape guides 5 and 6.

Figure 6:
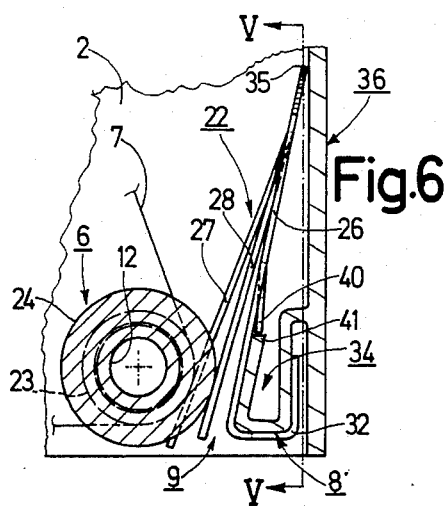
FIG. 6 is a sectional plan view taken on the line VI—VI in FIG. 5.

In the embodiment shown in FIGS. 5 and 6 a resilient element 22 co-operates with a tape guide 6, which in the present case is formed by a roller 23 having flanges 24 and 25 which extend along the edges of the magnetic tape 7. The resilient element 22 is a leaf spring having a main body 26 from which two parallel spaced limbs 27 and 28 project, which limbs constitute the two contact portions of the resilient element, the limb 27 being disposed tangentially in the longitudinal plane of symmetry of the magnetic tape 7 against the coating side of said tape at the location of the tape guide 6 and the limb 28 being disposed tangentially against the flange 24 of the tape guide 6 beside the magnetic tape 7. Thus, an electrically conductive connection is established between the coating side of the magnetic tape 7 and the tape guide 6, which in its turn, when the magnetic-tape cassette is in the operating position, is electrically connected to the locating pin 21 on the apparatus, so that electrostatic charges on the coating side of the magnetic tape are drained to the reference potential via the electrical connection described in the foregoing.

In the present embodiment the main body 26 is strip-shaped up to the free ends of the limbs 27 and 28, the limbs 27 and 28 being spaced from said body by punched-out portions 29, 30 and 31 and projecting from the major strip surface in the same direction towards the tape guide 6. Furthermore, at its end adjacent the free ends of the limbs 27 and 28 the main body 26 comprises two U-shaped angular portions 32 and 33, which serve for mounting the resilient element inside the magnetic-tape cassette. For this purpose, the resilient element 22 is inserted from outside the magnetic-tape cassette into the opening 9 in this cassette with the main body 26 in front, until the U-shaped portions 32 and 33 engage a corresponding profile 34 of the cassette wall 8 formed by the two housing sections 2 and 3 and thereby position and retain the complete resilient element inside the magnetic tape cassette. When the resilient element has thus been inserted into the opening 9 in the magnetic-tape cassette its limb 27 tangentially contacts the coating side of the magnetic tape 7 at the location of the tape guide 7 and its limb 28 contacts the flange 24 of the tape guide 6, thereby establishing the electrically conductive connection between the two parts. It is obvious that the profile of the cassette wall 8 with the opening 9, which profile corresponds to the two U-shaped portions 22 and 23 of the main body 26, can also be obtained by giving this cassette wall a different shape; for example, the U-shaped portions 32 and 33 may also directly engage a corner of the magnetic-tape cassette formed by the cassette wall 8 with the opening 9.

When the resilient element 22 has been inserted completely into the opening 9 of the magnetic-tape cassette as can be seen in FIG. 6, the main body 26 is resiliently braced inside the magnetic-tape cassette with its end 35 which is remote from the U-shaped angular portions 32 and 33 in that this end is positioned against the cassette wall 36 which adjans the cassette wall 8. This ensures a particularly accurate position of the resilient element inside the cassette and an exactly defined pressure of the limbs 27, 28 on their contact surfaces, which guarantees a satisfactory and stable contact by means of the resilient element.

In the present embodiment the main body 26 of the resilient element 22 comprises a further limb 40, which is spaced from said body by the punched-out portions 37, 38 and 39 and which projects from its major strip surface, the free end of this further limb being located behind a stop 41 formed by a portion of the cassette wall 8, upon insertion of the resilient element into the opening 9 in the cassette wall 8, which can be seen in particular in FIG. 6. As a result of this the resilient element is latched in the magnetic-tape cassette, so that it cannot become detached inadvertently, thereby ensuring a particularly reliable position of the resilient element. In the present embodiment the limb 40 extends from the strip surface of the main body 26 in a direction opposite the directions of the limbs 27 and 28. However, latching constructions in which the limb 40 is oriented in the same way as the limbs 27 and 28 may also be used, for example, if there is provided a separate stop for the free end of the limb 40 on the magnetic-tape cassette.

Figure 7:
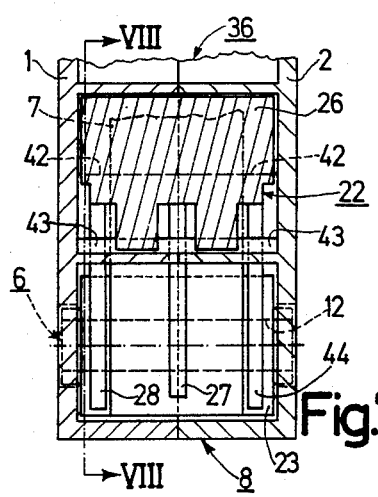
FIG. 7, similarly to FIG. 5, is a sectional side view of a second embodiment in which the resilient element is formed by a leaf spring, whose main body is fitted into a pocket-shaped recesses in the housing of the magnetic-tape cassette.
Figure 8:
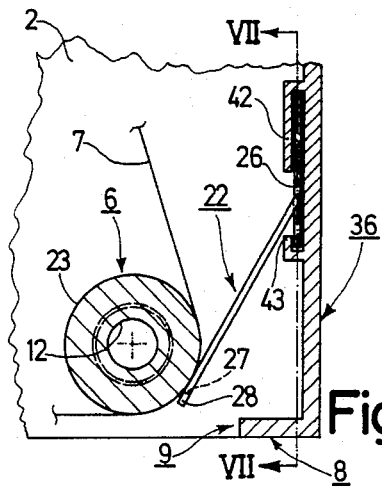
FIG. 8, similarly to FIG. 6, is a sectional plan view taken on the line VIII—VIII in FIG. 7.

In the embodiment shown in FIGS. 7 and 8 the resilient element 22, which is again formed by a leaf spring, comprises a main body 27, which serves for arranging the resilient element inside the magnetic-tape cassette. For this purpose pocket-shaped projections 42 and 43 are formed on the cassette wall 36 constituted by the housing sections 2 and 3, into which the main body 26 of the resilient element is fitted when the magnetic-tape cassette is assembled. The contact portions of the resilient element are again formed by spaced parallel limbs which project from the main body 26 three limbs 26, 28 and 44 being provided in the present example. In the same way as in the embodiment shown in FIGS. 5 and 6 the limb 27 is disposed tangentially against the coating side of the magnetic tape 7 at the location of the tape guide 6, which in the present case is formed by a simple roller 23, and extends in the longitudinal plane of symmetry of said tape. For the contact with the tape guide 6 there are provided two limbs, namely the limbs 27 and 44 which contact the roller 23 itself tangentially and symmetrically relative to the limb 28, beside the magnetic tape 7. In this way an electrical connection is established between the coating side of the magnetic tape and the tape guide. As a result of the perfectly symmetrical contact of the limbs with the magnetic tape and the tape guide it is ensured that the tape transport itself is not influenced in an undesired manner.

Figure 9:
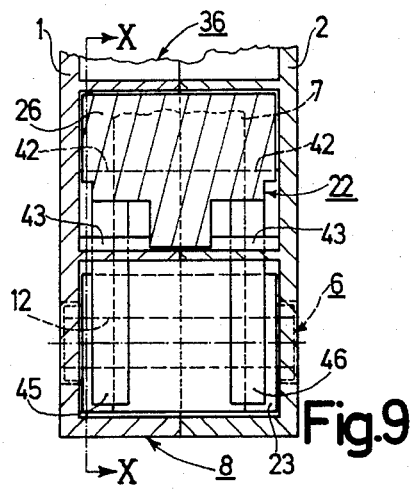
FIG. 9 is a sectional side view of a modification of the embodiment shown in FIG. 7, in which two contact portions of the resilient element are together formed by one strip-shaped resilient tongue.
Figure 10:
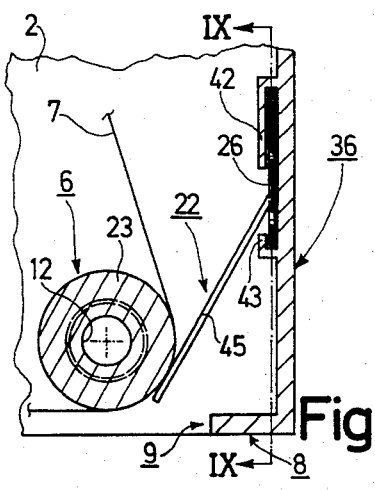
FIG. 10, similarly to FIG. 6, is a sectional plan view taken on the line X—X in FIG. 9.

In the embodiment shown in FIGS. 9 and 10 the resilient element 22 is again a leaf spring with a main body 26, which is positioned inside the magnetic-tape cassette in the same way as in the embodiment shown in FIGS. 7 and 8. However, in the present case the contact portions of the resilient element are together formed by a strip-shaped resilient tongue 45 and 46 respectively, which contacts the coating side of the magnetic tape 7 at the location of an edge portion of the tape and which contacts the tape guide 6 itself beside said edge portion. As is apparent from FIG. 9, the present embodiment comprises two such resilient tongues 45 and 46, which each co-operate with one of the two edge portions of the magnetic tape and with the tape guide 6 besides the relevant edge portion, so that again a symmetrical arrangement is obtained, which has not adverse effect on the tape transport. However, in principle it is also possible to use only one of the two resilient tongues. If in such a case, at a corresponding contact pressure, the tape transport would be influenced which as is known would result in a tendency of the magnetic tape to move upwards in the axial direction of the tape guide, this effect may be utilized to keep the relevant edge portion of the magnetic tape in engagement with a separate lateral tape guide. In the present embodiment the tape guide 6 is again formed by a simple roller 23, so that for the resilient tongues 45 and 46 the transition from the edge portion of the magnetic tape to the roller 23 is very simple because the tongues may be flat. However, if for example the resilient tongues have suitable profiled it is also possible to employ tape guides with flanges.

FIGS. 11 and 12 show an embodiment in which the resilient element 22 is a spring having two limbs which are biassed towards each other, the two limbs forming the contact portions of the resilient element and a limb 47 tangentially contacting the coating side of the magnetic tape 7 at the location of the tape guide 6 and the other limb 48 contacting the tape guide itself tangentially beside the magnetic tape 7, namely at the location of the flange 25 of this guide. As the two limbs 47 and 48 are biassed towards each other, the two limbs forming the contact portions of the resilient element and a limb 47 tangentially contacting the coating side of the magnetic tape 7 at the location of the tape guide 6 and the other limb 48 contacting the tape guide itself tangentially beside the magnetic tape 7, namely at the location of the flange 25 of this guide. As the two limbs 47 and 48 are biassed towards each other they are reliable in contact with the magnetic tape and the tape guide, so that a satisfactory electrical contact with both elements is guaranteed. In the present case the spring is a helical spring, whose central portion 49 which connects the two limbs 47 and 48 serves for mounting the spring inside the magnetic-tape cassette, for which purpose the central portion 49 is slid onto a pin-shaped projection 50 on the housing half 3 of the magnetic-tape cassette. A corresponding projection 51 on the other housing half 2 maintains the position of the spring on the projection 50. It will be appreciated that the spring need not be constructed as a helical spring; it may for example also be a correspondingly shaped and pretensioned leaf spring.

In the embodiment shown in FIGS. 13, 14 and 15 the resilient element 22 is an L-shaped element whose limbs 52 and 53 form the contact portions of the resilient element, a limb 51 being positioned against the coating side of the magnetic tape 7 in the axial direction of the tape guide 6 and the other limbs 53 being positioned against an axial end surface of the tape guide 6 itself, which guide in the present case is for example a simple roller 23. As is apparent in particular from FIG. 15, the limb 52 is S-shaped, in order to ensure a correct contact with the coating side of the magnetic tape. The limb 53 extends between the major surface of the housing section 3 and the axial end surface 54 of the roller 23 facing said major surface, a U-shaped portion 55 surrounding the relevant journal 56 of the roller 23. Thus, as it rotates the roller 23 contacts the limb 53 of the resilient element with its surface 54, so that again a reliable contact between these two parts is obtained. The resilient element 22 is secured inside the magnetic-tape cassette by rivets 57 and 58, which secure the limb 53 to the housing section 3.

It will be appreciated that several modifications to the embodiments described in the foregoing are possible without departing from the scope of the invention. This applies in particular to the construction of the resilient element and its arrangement inside the magnetic-tape cassette and to the construction of the tape guide, which alternatively may be a non-rotatable part with a cylindrical circumferential surface.

What is claimed is:

1. A magnetic-tape cassette, adapted for use with a magnetic-tape apparatus having an electrically conductive locating pin which is arranged thereon and which is at the reference potential of the apparatus; said cassette comprising at least one electrically conductive cylindrical tape guide arranged to be movable to a limited extent and formed with at least one axial recess which is accessible from the exterior of the magnetic tape cassette for engagement by a locating pin of an apparatus in which the cassette is inserted, and a magnetic tape having a base side arranged to pass along a part of the circumferential surface of said tape guide, and a magnetic coating side,
characterized by comprising an electrically conductive resilient element associated with the tape guide, arranged inside the magnetic-tape cassette adjacent the coating side of the magnetic-tape, said element comprising at least two portions; one of said portions contacting the coating side of the magnetic tape at the location of the tape guide, and the other portion being an electrically conductive contact with the tape guide.

2. A cassette as claimed in claim 1, characterized in that said resilient element is a leaf spring comprising a main body and at least two spaced substantially parallel limbs projecting from said body; said limbs forming said portions respectively, one limb being disposed tangentially against the coating side of the magnetic-tape, and the other limb being disposed tangentially against the tape guide at a location adjacent the magnetic-tape; and said main body being arranged to locate the resilient element inside the cassette.

3. A cassette as claimed in claim 2, having a cassette wall adjacent the tape guide, said wall having an opening which extends tranversely of said guide,
characterized in that said limbs are spaced from said body by punched-out portion and have free ends, said body being strip-shaped up to said free ends; said free ends project from a major strip surface in the same direction towards the tape guide; said main body comprises at least one U-shaped angular portion at an end adjacent the free ends of the limbs; and said resilient element is insertable into the opening of the cassette wall from outside the cassette, the U-shaped angular portion of the main body engaging a corresponding profile of the cassette wall.

4. A cassette as claimed in claim 3, characterized in that said main body comprises a further limb projecting from the major strip surface and being spaced from said body by punched-out portions, and in that said cassette comprises a stop, upon insertion of the resilient element into the opening in the cassette wall and said further limb having a free end located behind said stop.

5. A cassette as claimed in claim 3 or 4, characterized in that said main body is resiliently braced inside the cassette by a body end remote from the U-shaped angular portion.

6. A cassette as claimed in claim 5 characterized in that said tape has a longitudinal plane of symmetry, and said portion of the resilient element which is in contact with the coating side of the magnetic tape is positioned against said coating side at the location of said plane.

7. A cassette as claimed in claim 1, characterized in that said resilient element is a spring having two limbs which are biased toward each other, each limb constituting one of said portions of the resilient element; one limb being disposed tangentially against the coating side of the magnetic-tape, the other limb being disposed tangentially against the tape guide at a location adjacent the magnetic-tape; and said spring having a central portion interconnecting said two limbs, braced inside the magnetic-tape cassette.

8. A cassette as claimed in claim 1, characterized in that said resilient element is an L-shaped element having two limbs which form the respective portions of the resilient element, one limb being disposed against the coating side of the magnetic tape and extending in an axial direction of the tape guide, and the other limb being disposed against an axial end surface of the tape guide.

9. A cassette as claimed in claim 1, 2, 3, 4, 7, or 8, characterized in that said tape has a longitudinal plane of symmetry, and said portion of the resilient element which is in contact with the coating side of the magnetic-tape is positioned against said coating side at the location of said plane.

10. A cassette as claimed in claim 1, characterized in that said element comprises a strip-shaped resilient tongue forming said two portions, said tongue being in contact with the coating side of the magnetic-tape at an edge portion of the tape, and being in contact with the tape guide at a location adjacent said edge portion.

* * * * *

UNITED STATES PATENT AND TRADEMARK OFFICE
CERTIFICATE OF CORRECTION

PATENT NO. : 4,509,087
DATED : April 2, 1985
INVENTOR(S) : LOTHAR JAGER ET AL

It is certified that error appears in the above—identified patent and that said Letters Patent is hereby corrected as shown below:

Claim 1, line 21, (Col.9, line 27) change "being an" to --being in--;

Claim 3, line 6, (Col. 9, line 43) change "portion" to --portions--;

Claim 4, line 6, (Col. 10, line 9) delete "and".

Signed and Sealed this

Sixteenth Day of July 1985

[SEAL]

Attest:

DONALD J. QUIGG

Attesting Officer

Acting Commissioner of Patents and Trademarks